United States Patent [19]

Lukich

[11] Patent Number: 5,214,916
[45] Date of Patent: Jun. 1, 1993

[54] CONTROL SYSTEM FOR A HYDRAULIC WORK VEHICLE

[75] Inventor: Michael S. Lukich, Peoria, Ill.

[73] Assignee: Caterpillar Inc., Peoria, Ill.

[21] Appl. No.: 819,682

[22] Filed: Jan. 13, 1992

[51] Int. Cl.$^5$ .............................................. F16D 31/02
[52] U.S. Cl. ......................................... 60/431; 60/433
[58] Field of Search .................. 60/368, 431, 433, 434

[56] References Cited

U.S. PATENT DOCUMENTS

| | | | |
|---|---|---|---|
| 3,821,625 | 6/1974 | Scholl | 318/624 |
| 4,523,892 | 6/1985 | Mitchell et al. | 417/34 |
| 4,534,707 | 8/1985 | Mitchell | 417/34 |
| 4,712,376 | 12/1987 | Handank | 60/427 |
| 4,718,329 | 1/1988 | Nakajima et al. | 91/445 |

FOREIGN PATENT DOCUMENTS

0235545B1 9/1990 European Pat. Off. .

OTHER PUBLICATIONS

Application No. 07/817,569 filed Jan. 7, 1992 Title: Hydraulic Control Apparatus Attorney Docket No.: 91-318.

*Primary Examiner*—Edward K. Look
*Assistant Examiner*—F. Daniel Lopez
*Attorney, Agent, or Firm*—David M. Masterson

[57] ABSTRACT

An apparatus controls an electrohydraulic system of a work vehicle. The work vehicle has a engine, at least one fluid circuit having a variable displacement pump driven by the engine, and a plurality of control valves for controllably passing fluid from the variable displacement pump to a plurality of respective work elements. A device produces a signal indicative of a desired velocity of a respective work element. A device senses a load on a work element and producing a signal representative of the actual load in response to the sensed load. A control device receives the desired velocity signal and load signals, and responsively calculates a desired power level for the electrohydraulic system. Responsively, the control device produces an engine speed command signal indicative of an optimum engine speed in response to the desired power level.

12 Claims, 2 Drawing Sheets

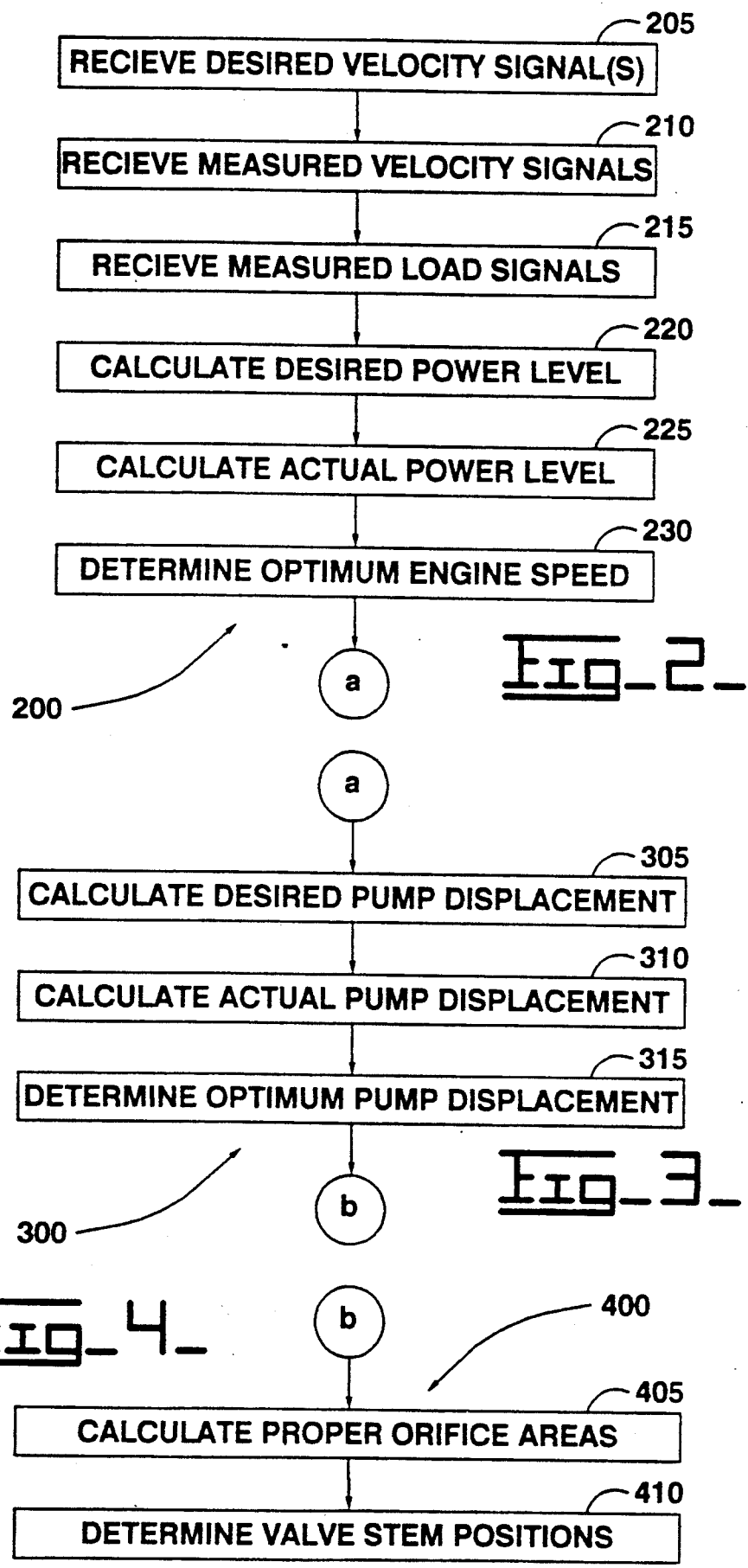

CONTROL SYSTEM FOR A HYDRAULIC WORK VEHICLE

DESCRIPTION

1. Technical Field

This invention relates generally to a control system for a hydraulic work vehicle and, more particularly, to a control system for controlling engine speed, hydraulic pump displacement, and fluid flow through directional valves in response to sensory inputs.

2. Background Art

In the field of hydraulic work vehicles, for example, excavators, variable displacement hydraulic pumps are typically driven by an engine, providing hydraulic power to a plurality of work elements which includes the drive system. Excavators, being extremely versatile machines, are useful in performing a large number of different and varied tasks (e.g. pipelaying, mass excavation, trenching, logging, etc.), each task having its own unique hydraulic flow and pressure requirements. For example, during mass excavation, hydraulic power requirements are quite high with brief periods of reduced need, but in pipelaying, sustained periods of low power during waiting are common with sessions of moderate to high power.

Rudimentary control schemes have been utilized to control the engine speed of an excavator. For example, these control schemes have shown that the engine speed may be reduced to low idle during sustained periods of waiting to conserve fuel. However, these types of control schemes do not recognize controlling the engine speed during active times where less than maximum engine speed and pump flow would be required.

More sophisticated control schemes have shown that the engine speed and hydraulic pump displacement can be controlled in response to loads subjected on the work vehicle. For example, U.S. Pat. No. 4,523,892 issued to Mitchell et al. on June 18, 1985, discloses an electronic control system for a hydraulic excavator which controls the engine speed and pump displacement. The control system reduces pump displacement in response to the operating speed of the engine lugging below a desired operating speed. Further, the control system reduces the engine speed in response to the operating speed of the engine rising above the desired operating speed. In this manner, the electronic control adjusts for engine lag but the electronic control does not correct the inefficiencies of the system. Thus, the electronic control does not minimize fuel consumption nor eliminate undesirable engine lag.

The present invention is directed to overcoming one or more of the problems as set forth above.

DISCLOSURE OF THE INVENTION

In one aspect of the present invention, an apparatus controls an electrohydraulic system of a work vehicle. The work vehicle has a engine, at least one fluid circuit having a variable displacement pump driven by the engine, and a plurality of control valves for controllably passing fluid from the variable displacement pump to a plurality of respective work elements. A device produces a signal indicative of a desired velocity of a respective work element. A device senses a load on a work element and producing a signal representative of the actual load in response to the sensed load. A control device receives the desired velocity and load signals for each work element and responsively calculates a desired power level for the electrohydraulic system. Responsively, the control device produces an engine speed command signal indicative of an optimum engine speed in response to the desired power level.

BRIEF DESCRIPTION OF THE DRAWINGS

For a better understanding of the present invention, reference may be made to the accompanying drawings in which:

FIG. 2 is a flowchart depicting the algorithm used by an electronic control system for controlling the speed of an engine;

FIG. 3 is a flowchart depicting the algorithm used by an electronic control system for controlling the pump displacements; and FIG. 4 is a flowchart depicting the algorithm used by an electronic control system for controlling the valve stem displacements.

BEST MODE FOR CARRYING OUT THE INVENTION

Figure 1:
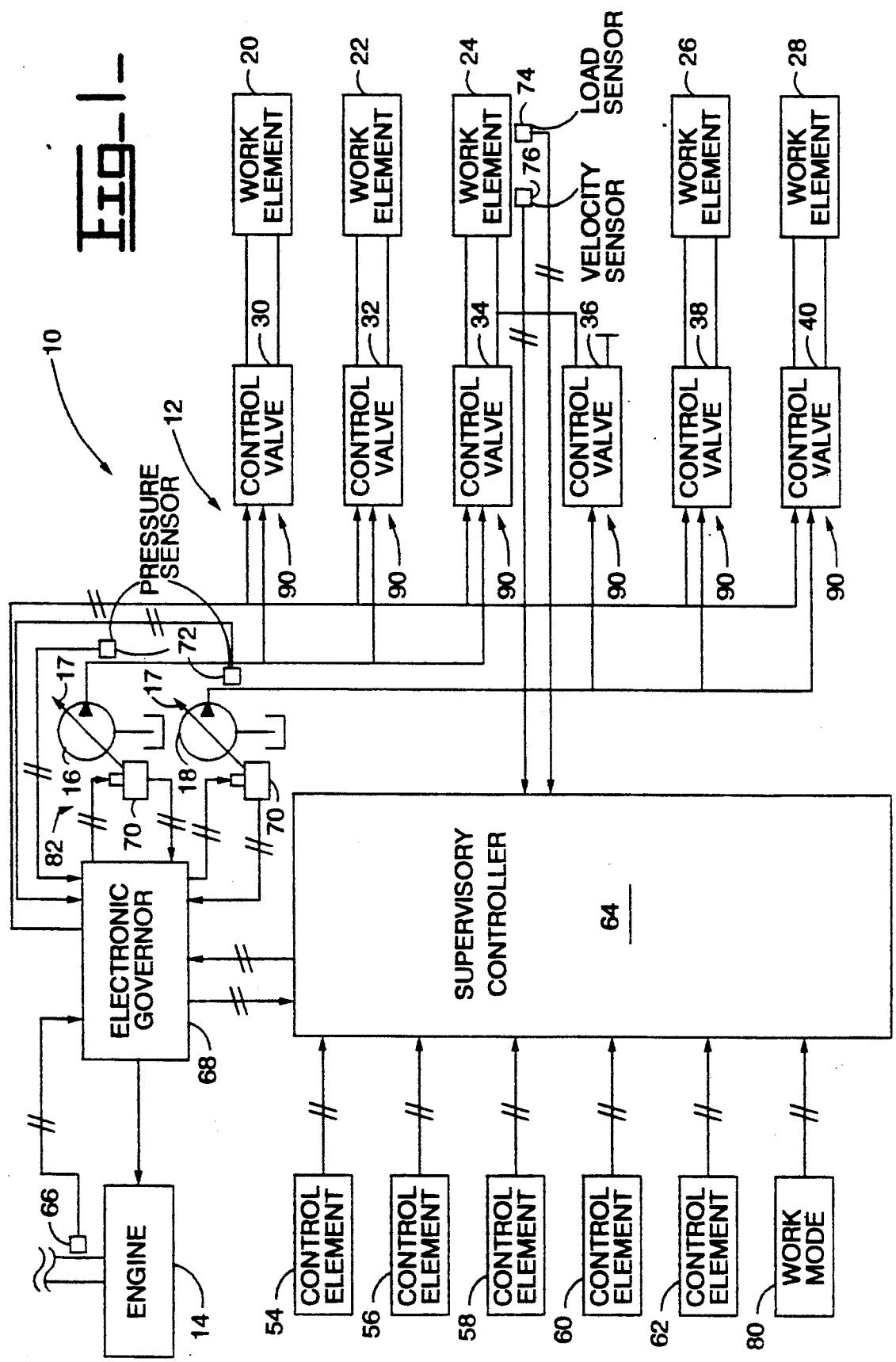
FIG. 1 illustrates a diagrammatic view of an embodiment of a hydraulic system of the present invention which has one or more pumps serving one or more circuits each having a plurality of serially connected work elements.

FIG. 1 illustrates an embodiment of the electrohydraulic system 10 associated with the present invention. A hydraulic system 12 on a work vehicle, such as an excavator or loader, includes a power source 14, commonly an internal combustion engine. The engine 14 drives one or more variable displacement pumps 16,18 which deliver fluid to a plurality of work elements 20,22,24,26,28. The pumps 16,18 each include an adjustable swashplate 17. The work element may include a hydraulic engine or cylinder (not shown) having a moveable piston. The piston has a predetermined cross-sectional area.

Control valves 30,32,34,36,38,40 are placed in the fluid path between the variable displacement pumps 16,18 and their respective work elements 20,22,24,26,28 for controlling the fluid delivered to the work elements. Each control valve includes a spool or stem (not shown) for movement therein. The control valves are closed-center, pressure compensated valves; however, the present invention is equally suited towards open-center, non-pressure compensated valves as well.

In the preferred embodiment, the control valves are electrically actuatable. The fluid flow is controlled by electrical signals which proportionally displace the valve stems metering fluid from the variable displacement pumps 16,18 to the respective work implements 20,22,24,24,28,26. An electronic governor 66 delivers the electrical signals to the control valves for controlling the position of the valve stems. Preferably, the control valves include sensors adapted to produce electrical signals representative of the actual position of the valve stem. The valve stem sensors may include LVDT devices as are well known in the art.

Operator control elements 54,56,58,60,62, for example, electronic joysticks, are connected to a supervisory controller 64. The operator control elements produce electrical signals in a well known manner. For instance, a potentiometer or digital encoder, may be utilized to produce the electrical signals. The signals, which are indicative of operator demand for a desired velocity of the work elements, are received by the supervisory controller 64.

A speed sensing device 66 provides a signal representative of the actual engine speed. For example, the speed sensing device 66 is sensitive to the movement of gear teeth on an engine, as is well known in the art. The device delivers a signal to an electronic governor 68 representative of the actual speed of the engine. Advantageously, the electronic governor 68 is electrically connected to the engine 14 and is adapted to electronically control the speed of the engine as is well known.

A swashplate angle sensing device 70 senses the angle of the swashplate 17. The swashplate sensing device 70 delivers an electronic signal representative of the actual swashplate angle to the electronic governor 68. Further, an electronic pressure device 72 senses the output pressure of each pump 16,18 and a representative signal is delivered to the electronic governor 68. The electronic governor 68 adjusts the inclination of the swashplate in response to receiving the sensed signals, thereby controlling the displacement of the pumps 16,18.

Load sensors 74 are provided for each work element to detect the load applied to each work element. Responsive to the detected load on each work element, the load sensor 74 delivers an electronic signal to the supervisory controller 64. The load sensors 74 may be in the form of electronic pressure sensors, for example.

Velocity sensors 76 are provided for each work element to produce a signal representative of the movement, or more particularly, the velocity of each work element. In one embodiment, a velocity sensor 76 may include a DC generator which when rotated, generates a voltage indicative of the velocity of rotation (and thus the linear velocity of a respective work element). In a second embodiment, the velocity sensor 76 may include a position sensor. For example, a radio frequency (RF) linear position sensor. The velocity sensor 76 determines the velocity of the work element by numerically filtering and differentiating the position signal.

The electronic governor 68 is a microprocessor based system which includes signal conditioning, drive power circuitry, arithmetic operations, and suitable memory. The electronic hardware and software associated with the electronic governor is well known and will not be further discussed.

As shown, the electronic governor 68 is electrically connected to the supervisory controller 64. The supervisory controller 64 is a microprocessor based system which utilizes arithmetic units for controlling processes. Typically, the program is stored in read-only memory, random-access memory, or the like. Algorithms, important in the function of the supervisory controller 64 are shown in the various flow charts.

The flowcharts illustrated in FIGS. 2-4, represent computer software logic for implementing the preferred embodiment of the present invention. The program depicted on the flowcharts is adapted to be utilized by any suitable microprocessor system.

FIG. 2 depicts an algorithm associated with an engine control means 200 for determining the optimum engine speed of the engine 14. Beginning with block 205, the controller 64 receives one or more signals, indicative of a desired velocity of a work element, from respective control elements. The controller 64 receives the measured velocity signals, representative of the actual velocity of the respective work elements, from the various velocity sensors in block 210. Further, in block 215, the controller 64 receives the measured load signals, indicative of the load imposed on the respective work elements, from the various load sensors.

In block 220 and block 225, respectively, the algorithm calculates the desired and actual power levels ($HP_D$, $HP_{ACT}$) associated with the hydraulic system by the following formula:

$$HP_D = \sum_1^N L * V_{DES}$$

$$HP_{ACT} = \sum_1^N L * V_{ACT}$$

As shown, the power levels $HP_D$, $HP_{ACT}$ are calculated from a summation of the individual power levels associated with each work element. The total number of work elements is denoted by N. The individual power levels are found by the product of the sensed load, L, and either the desired or sensed velocity, $V_{DES}$, $V_{ACT}$, of the respective work elements.

Once the desired and actual power levels ($HP_D$, $HP_{ACT}$) are calculated the algorithm then responsively determines the optimum engine speed for the hydraulic system in block 230. The optimum engine speed is determined by storing empirically determined data representing a series of preferred engine speeds at corresponding power levels ($HP_D$, $HP_{ACT}$). The stored data is then compared to the calculated power levels. In the preferred embodiment, a two-dimensional look-up table of a type well-known in the art is used to complete the comparison and select a value representing the optimum engine speed for minimizing fuel consumption. The number of characteristics stored in memory is dependent upon the desired precision of the system. Interpolation may be used to determine the optimum engine speed in the event that the measured and calculated value fall between the discrete values stored in memory. The optimum engine speed is determined in response to the value of the desired power level $HP_D$. Advantageously, the algorithm utilizes the value of the actual power level $HP_{ACT}$, to control the power level of the hydraulic system to the desired power level, $HP_D$.

Once the optimum engine speed is determined, the supervisory controller 64, produces an engine speed command signal representative of the optimum engine speed. The electronic governor 68 receives the engine speed command signal and responsively adjusts the engine speed to the optimum level. Advantageously, the electronic governor 68 receives the actual engine speed signal from the speed sensing device 66 and calculates an error signal proportional to a difference between the magnitude of the engine speed command signal and the actual engine speed signal. Responsively, the electronic governor 68 controls the speed of the engine causing the error signal to approach to zero.

FIG. 3 depicts the algorithm associated with a pump control means 300 for determining the optimum pump displacement for the system 12. The algorithm utilizes the received values obtained earlier in blocks 205, 210, and 215 of FIG. 2. The algorithm begins with blocks 305 and 310 where the desired and actual pump displacements ($P_D$, $P_{ACT}$) are calculated. The formulas for calculating the the pump displacements are:

$$P_D = \sum_1^N A * V_{DES}$$

$$P_{ACT} = \sum_{1}^{N} A \cdot V_{ACT}$$

As shown, the desired and actual displacements for each pump 16,18 are calculated from a summation of the product of the cross-section area of the work element, A, (i.e. areas of a hydraulic cylinder) and the desired or sensed velocity, $V_{DES}$, $V_{ACT}$, of the respective work elements.

Once the desired and actual displacement values for the pumps 16,18 are calculated, the algorithm then determines the optimum pump displacement for each pump 16,18 in block 315. The optimum pump displacement is derived from empirically determined data representing a map of pump displacements at corresponding load (pressure) levels. The stored data is then compared to the calculated pump displacement values. In the preferred embodiment, a two-dimensional look-up table is used to complete the comparison and select a value representing the optimum pump displacement. The optimum pump displacement is determined in response to the desired pump displacement, $P_D$.

Once the optimum pump displacements are determined, the supervisory controller 64, produces a pump displacement command signal associated with each pump 16,18. The pump displacement command signal is representative of the optimum pump displacement. The electronic governor 68 receives the pump displacement command signal associated with each pump 16,18 and responsively adjusts the pump displacement to the optimum level. Advantageously, the electronic governor 68 may receive a signal representative of the actual pump displacement, $P_{ACT}$. Using classical PID feedback control, the electronic governor 68 adjusts the inclination of the swashplate 17 to control the displacement of the respective pump 16,18 to the optimum level. Alternatively, the electronic governor 68 may adjust the pump displacement of the pumps 16,18 to the optimum level in response to receiving the actual swashplate and discharge pressure signals from the swashplate angle sensing device 70 and load sensor 72, respectively.

Referring now to the flowchart depicted in FIG. 4, a valve control means 400 determines a desired valve stem position to properly meter hydraulic fluid to a respective work element. Thus, allowing for the work element to move at the desired velocity. The algorithm utilizes the received values obtained earlier in blocks 205, 210, and 215 of FIG. 2. The algorithm begins with block 405 by calculating the valve stem displacements which are proportional to the proper orifice areas of each valve. The proper orifice areas of each valve are the orifice areas required to meter the proper fluid flow. The calculations are not shown but are well known in the art. For example, the well known knife-edge orifice equation may be utilized to obtain the proper orifice areas of each valve. Optimally, the equation utilizes many of the sensed pressure values and the geometry of each valve must be known. Once the proper orifice area is calculated for each valve, the algorithm then proceeds to block 410 to determine the corresponding valve stem position for each valve. The valve stem position is provided by storing empirically determined data representing a series of valve stem positions corresponding to predetermined orifice areas.

Once the proper valve stem position for each control valve determined, the supervisory controller 64, produces a valve stem position command signal representative of the proper valve stem displacement for each valve. The electronic governor 68 receives the valve stem displacement command signal and responsively adjusts the valve stem position of each stem to the optimum level. As stated above, the electronic governor 68 receives the actual valve stem position signal for each valve. Advantageously, the electronic governor 68 calculates an error signal proportional to a difference between the magnitude of the actual valve stem position signal and the valve stem command signal. Responsively, the electronic governor 68 controls the position of the valve stem thereby causing the error signal to approach zero utilizing a classical PID control algorithm.

The supervisory controller 64 may receive a signal representing a desired work mode from a work mode switch 80. The work mode switch 80 represents a plurality of work modes. Here, a work mode is defined as an electrohydraulic switching of valves to achieve a predetermined hydraulic circuit arrangements. Each hydraulic circuit arrangement is responsive to a predetermined task to be performed by the work vehicle. The tasks may include mass excavating, truck loading, finishing, etc. The calculations preformed by the supervisory controller 64 may be modified to include values representing the desired work mode.

It may be desirous to transfer information containing the measured and calculated values from the electronic governor 68 to the supervisory controller 64. This data may then be utilized for future analysis of the electrohydraulic system 10.

INDUSTRIAL APPLICABILITY

In operation, the present invention is adapted to control the hydro-mechanical system of a work vehicle, for example an excavator. As discussed above, each work element has an associated load sensor 74 and velocity sensor 76. The supervisory controller 64 receives appropriate signals from the various sensors. Further the supervisory controller 64 receives the desired velocity signal(s) of the work elements from the control elements.

Responsive to the received signals the supervisory controller 64 performs the calculations as described above and delivers an engine speed command signal to the electronic governor 68. Consequently, the electronic governor 68 controls the engine speed to an optimum level defined by the engine speed command signal to minimize fuel consumption. Thereafter, the supervisory controller 64 delivers the pump displacement command signals associated with each pump 16,18 to the electronic governor 68. Responsively the electronic governor 68 adjusts the inclination of the swashplate of each pump 16,18 to achieve the optimum pump displacement. After the pumps are producing fluid flow at the optimum displacement for the hydraulic system 12, the supervisory controller 64 delivers the valve stem position signals to the electronic governor 68. Consequently, the electronic governor 68 controls the valve stem to the proper position to achieve the proper flow rate to achieve the desired velocity of the work element.

Thus, the control firstly controls the speed of the engine to the optimum speed, then secondly controls the displacement of the pumps to the optimum displacements, and then lastly controls the position of the valve stems to properly meter hydraulic fluid thereby achieving the desired velocity of the work element. In this manner, the control is said to be anticipatory. Therefore, the hydraulic system will operate at optimum efficiency realizing superior fuel economy without adverse effects of engine lag.

While the present invention has been described primarily in association with hydraulic excavators, it is recognized that the invention could be implemented on most any engine and hydraulic pump arrangement.

Other aspects, objects and advantages of the present invention can be obtained from a study of the drawings, the disclosure and the appended claims.

I claim:

1. An apparatus for controlling an electrohydraulic system of a work vehicle having an engine, at least one fluid circuit having a variable displacement pump driven by the engine, a plurality of control valves for controllably passing fluid from the variable displacement pump to a plurality of respective work elements, each control valve including a stem, comprising:

- a operator control element adapted to produce a signal indicative of a desired velocity of one of said respective work elements;
- a load sensor adapted to detect a load on the one work element and produce a signal representative of the actual load in response to said detected load;
- a velocity sensor adapted to determine the velocity of the one work element and produce a signal representative of the actual velocity in response to said determined velocity;
- control means for receiving said desired velocity, actual velocity and load signals, responsively calculating a desired and an actual power level for the electrohydraulic system, and responsively producing an engine speed command signal indicative of an optimum engine speed and
- an electronic governor adapted to receive said engine speed command signal and responsively control the speed of the engine to the optimum engine speed.

2. An apparatus, as set forth in claim 1, including a means for sensing the speed of said engine and producing a signal representative of the actual speed in response to said sensed speed.

3. An apparatus, as set forth in claim 2, wherein said electronic governor receives said actual speed signal, calculates an error signal proportional to a difference between the magnitude of said engine speed command signal and said actual engine speed signal, and responsively controls the speed of said engine causing the error signal to approach zero.

4. An apparatus, as set forth in claim 1, wherein said control means includes means for calculating a desired pump displacement value in response to said desired velocity signal, and producing a pump displacement command signal indicative of an optimum pump displacement in response to said desired pump displacement value.

5. An apparatus, as set forth in claim 4, wherein said control means includes means for calculating a desired valve stem position value and responsively producing a valve stem command signal.

6. An apparatus, as set forth in claim 5, wherein said electronic governor receives said pump displacement and valve stem command signals, and responsively controls the displacement of said pump to the optimum pump displacement in response to said engine rotating at the optimum speed and the position of the valve stem to the desired stem position in response to said pump producing the optimum pump displacement.

7. An apparatus, as set forth in claim 6, including means for sensing the discharge pressure of said variable displacement pump and producing a signal representative of the actual discharge pressure in response to said sensed pressure.

8. An apparatus, as set forth in claim 7, wherein said variable displacement pump includes a swashplate and said electronic governor includes a means for sensing the angle of the swashplate and producing a signal representative of the actual swashplate angle in response to said sensed swashplate angle.

9. An apparatus, as set forth in claim 8, wherein said electronic governor adjusts the inclination of the swashplate to control the displacement of the pump to the optimum displacement in response to receiving said actual discharge pressure signal and said actual swashplate angle signal.

10. An apparatus, as set forth in claim 6, wherein said variable displacement pump includes a swashplate, and said control means includes a means for receiving said actual velocity signal, calculating an actual pump displacement value and responsively producing an actual pump displacement signal, said electronic governor being adapted to receive said actual pump displacement signal and calculate an error signal proportional to a difference between the magnitude of said pump displacement command signal and actual displacement signal and responsively adjust the inclination of the swashplate to cause the error signal to approach zero.

11. An apparatus, as set forth in claim 6, including means for sensing the position of a stem relative to a respective control valve and producing a signal representative of the actual position in response to said sensed position.

12. An apparatus, as set forth in claim 11, wherein said electronic governor receives said actual valve stem position signal, calculates an error signal proportional to a difference between the magnitude of said valve stem command signal and said actual valve stem position signal, and responsively controls the position of said valve stem causing the error signal to approach zero.

* * * * *